United States Patent [19]
Knox et al.

[11] Patent Number: 5,978,911
[45] Date of Patent: Nov. 2, 1999

[54] AUTOMATIC ERROR RECOVERY IN DATA PROCESSING SYSTEMS

[75] Inventors: Richard Ian Knox, Renfrewshire; Sohail Syyed, Strathclyde, both of United Kingdom

[73] Assignee: International Business Machines Corp., Armonk, N.Y.

[21] Appl. No.: 08/967,806

[22] Filed: Nov. 12, 1997

[30] Foreign Application Priority Data

Sep. 10, 1997 [GB] United Kingdom ................ 9719112

[51] Int. Cl.⁶ .......................................... G06F 9/44
[52] U.S. Cl. ............................ 713/1; 713/2; 395/712
[58] Field of Search .................................. 395/652, 712, 395/200.51, 200.54, 800, 185.08, 182.05; 380/4; 713/1, 2, 100; 714/55

[56] References Cited

U.S. PATENT DOCUMENTS

| | | | |
|---|---|---|---|
| 3,795,800 | 3/1974 | Nimmo | 235/153 |
| 4,654,821 | 3/1987 | Lapp | 364/900 |
| 5,596,711 | 1/1997 | Burckhartt et al. | 395/182.21 |
| 5,619,716 | 4/1997 | Nonaka et al. | 395/800 |
| 5,708,776 | 1/1998 | Kikinis | 395/185.08 |
| 5,732,275 | 3/1998 | Kullick et al. | 395/712 |
| 5,742,829 | 4/1998 | Davis et al. | 395/712 |
| 5,784,563 | 7/1998 | Marshall et al. | 395/200.51 |
| 5,790,664 | 8/1998 | Coley et al. | 380/4 |
| 5,796,952 | 8/1998 | Davis et al. | 395/200.54 |

FOREIGN PATENT DOCUMENTS 0445936 2/1991 United Kingdom.

OTHER PUBLICATIONS

United Kingdom Patent Office Search Report, Feb. 11, 1998.

*Primary Examiner*—Dennis M. Butler
*Attorney, Agent, or Firm*—Gregory M. Doudnikoff

[57] ABSTRACT

An error recovery technique is provided which is used during the automatic installation of software on a client data processing system from a connected server data processing system. The installation process is made up of a plurality of operations executing on the client, for example format client disk drive, load DOS, load Windows etc. Monitoring the successful completion of each of these operations on the client is watchdog timer code which preferably takes the form of device driver software received from the server system early in the installation process. At the beginning of each operation, a preselected time value is written to a counter in the watchdog timer, this time value representing a time period which is greater than the time normally taken for the operation to complete. If the counter expires before the operation is complete (if for example the server system or network fails), the client invokes an error recovery procedure which may for example involve rebooting the client.

13 Claims, 4 Drawing Sheets

AUTOMATIC ERROR RECOVERY IN DATA PROCESSING SYSTEMS

FIELD OF THE INVENTION

The present invention relates generally to an error recovery technique for data processing systems which finds particular, but not exclusive, use in the automatic recovery from errors occurring during the installation of software on client systems in a data processing network.

BACKGROUND OF THE INVENTION

In a typical data processing network environment, multiple client computer systems (clients) are connected to one or more server computer systems (servers). In one common arrangement, each client system includes an operating system, and optionally other software, stored on a mass storage device such as a hard disk drive within the client. On power-up or reboot, the client boots from the hard disk drive without reference to the server computer. Once operational and connected to the network, the client may choose to access and use programs or data resident on mass storage in the server.

A trend in recent years has been to reduce the so-called 'cost of ownership' of computer networks by, for example, providing the network administrator with the means to remotely control various operations on attached clients. Such operations include reflashing client system BIOS, changing BIOS password etc. The provision of remote control of client systems has the advantage that it reduces the need for the network administrator to physically attend the client computers, which may in some instances be located in a different building to the server system. An example of a network management product is the LAN Client Control Manager (LCCM) software from IBM Corporation.

One problem with relying on remote control of various operations on a client system is that, during the operation, the client system may malfunction in a way which requires the network administrator to attend the client in order to reset it. Furthermore, the operations executing on the client may require data or information from the server in order to complete. In this case, if the server or network malfunctions, then the client may be left 'hanging', unable to complete the operation. Again, remedial action may require physical attendance at the client.

As an example, when a client is first added to the network, it is typically necessary to install operating system software on the client hard disk drive. This is conventionally carried out by local installation of the software from CD-ROM, floppy disk or the like. Alternatively, the software can be installed by downloading it from the attached server. Software download requires the execution of a number of operations on the client, many of which are dependent for their completion on data and information from the server. If the network or server goes down during one of these operations, the client system may either hang or enter an infinite timeout/retry loop.

It would be desirable to have a technique useful for providing error recovery at an unattended client computer in the event of a problem at the client caused by an interruption in the transfer of data and/or information from the server.

SUMMARY OF THE INVENTION

According to a first aspect of the invention, there is provided a data processing system connectable for communication to a server data processing system having stored therein software for installation on the data processing system; the data processing system including: mass storage means for storing the software transferred from the server data processing system; means for installing the transferred software on the mass storage means in a plurality of installation operations; and watchdog timer code, executable on a processor of the data processing system, for monitoring the successful completion of each of the installation operations by measuring a preselected period of time for each operation and for invoking an error recovery procedure in the client system in the event that an installation step does not complete successfully prior to the expiration of the preselected period of time associated with the unsuccessful operation.

According to a second aspect there is provided a method for automatically installing software on a client data processing system from a server data processing system connected thereto, the method comprising: executing a plurality of installation operations on the client to load the software thereon; executing watchdog timer code on the client system to monitor the successful completion of each of the installation operations by measuring a preselected period of time for the execution of each of the software installation operations; and invoking an error recovery process in the client system on expiration of the preselected time period associated with any one of the installation operations.

Thus according to the foregoing aspects of the invention, a client system attached to a server system in a network can automatically recover from errors which occur due to a problem with the server or network during the initial installation of operating system software onto a hard disk drive of the client. In one preferred arrangement, the boot image sent from the server to the client at the beginning of the installation process includes the watchdog timer code in the form of a device driver.

As will be explained below, the device driver code is preferably loaded as early in the installation process as possible. In this way it is available to monitor the correct loading of other boot image components. As the installation proceeds, a timer setup program is preferably provided to write the preselected time periods to the device driver at the beginning of each installation operation. This avoids the need to have the time periods hard-coded in the device driver thus providing more flexibility.

Although the first and second aspects of the invention relate to the automatic installation of software, the present invention also finds use in other contexts where various operations on the client system depend for their completion on the receipt of information or data from the connected server system. Ordinarily, if the necessary data or information is not received within a particular period of time, the application executing on the client will invoke an error recovery procedure provided by the application itself. The present invention according to a third aspect provides watchdog timer code which operates independently of the executing application and removes the need for the developer of each application to provide a separate error recovery process.

According to a third aspect therefore the invention provides a method for monitoring the transfer of data from a server data processing system to a client data processing system connected thereto, the transfer operation comprising a plurality of steps, the method comprising: executing watchdog timer code on the client system to measure a preselected period of time for selected ones of the data transfer steps; and invoking an error recovery process in the client system in the event that one of the selected steps does not complete before the preselected time period associated therewith.

A preferred embodiment of the present invention will now be described, by way of example only, with reference to the accompanying drawings.

DETAILED DESCRIPTION OF THE PREFERRED EMBODIMENT

The present invention will be described in the context of a process for installing software on a client system from a server system.

Figure 1:
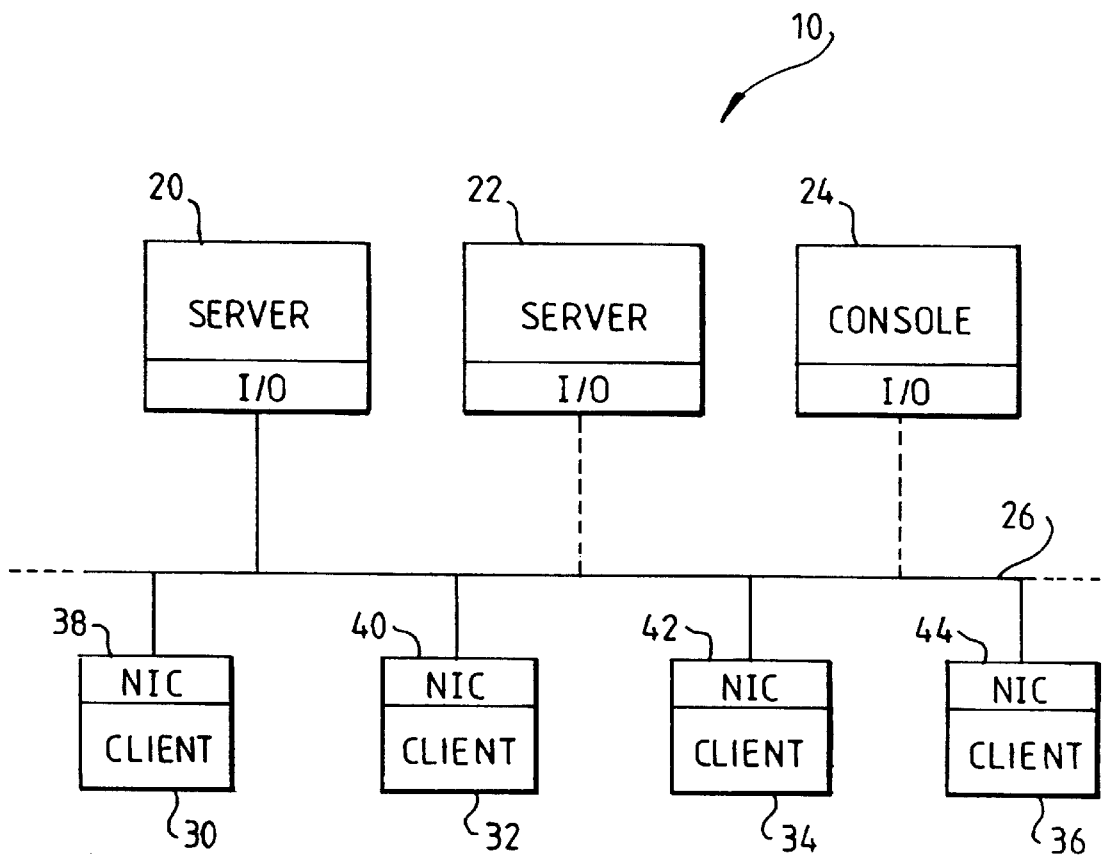
FIG. 1 is a schematic representation of a computer network in which the preferred embodiment of the present invention is practiced.

Referring firstly to FIG. 1, there is shown, in schematic form, a local area network (LAN) 10 in which a preferred embodiment of the invention is implemented. In FIG. 1 the network is constituted as an Ethernet network but may alternatively be configured as a Token-ring LAN or other arrangement. The network comprises a server computer system 20 (which in the present embodiment may be an IBM PC 730 computer system) connected for communication by a link 26, in a loop configuration, with a plurality of client computer systems 30, 32, 34, 36. The client computer systems may be personal computers based on the Intel x86 family of microprocessors or other forms of computer system. Each client system includes a LAN adapter card or network interface card (NIC) 38, 40, 42, 44 to provide communication with the server computer over link 26.

Optionally, the network includes one or more further server systems 22 and a console computer system 24 through which the network administrator controls the network. The console system will generally be similar to a client system except that it is arranged to provide the network administrator with certain privileges, not UK9-97-066 7 available to a client user, which allows him/her to control the network.

Control of resources on the network including communication between server and clients is effected by means of a network operating system (NOS) e.g. OS/2 LAN Server from IBM Corporation having a 'server' component which executes on the main processor(s) of the server computer system and a corresponding 'requester' component which executes on the main processor of each client computer system. Other suitable network operating systems include Netware from Novell Inc and OS/2 WARP server from IBM.

Figure 2:
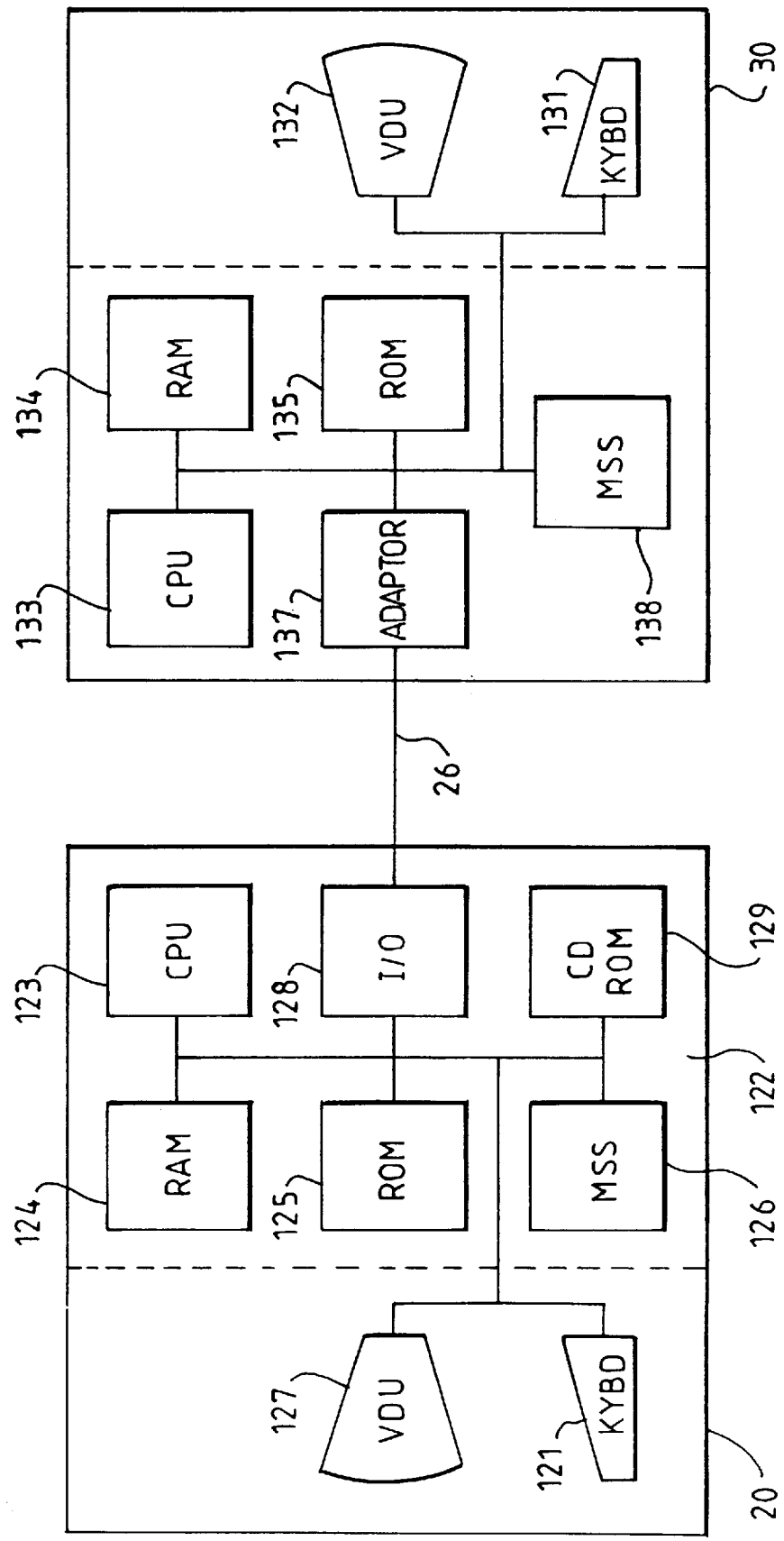
FIG. 2 is a block-diagrammatical representation of a client computer system connected to a server computer system in the network of FIG. 1.

FIG. 2 is a simplified block diagram showing the connection of server computer system 20 to client system 30 over communication link 26. As is normal, the client system, constituted in the present embodiment by a personal computer, includes a keyboard 131 and a display 132 operating under the control of control logic in the form of main CPU 133 which is connected by a system bus to system memory (RAM) 134 and non-volatile memory (ROM) 135, in which is stored system BIOS including POST code. The client system further includes a network adapter card 137 which, in the present embodiment, may be either an ethernet or token-ring adapter card. This adapter card includes non-volatile memory in the form of ROM in which is stored code employed in providing communication between the client and server. The client system further includes mass storage 138 in the form of a magnetic disk drive (hard file) for storing operating system and other software. The client may further include (not shown) a diskette drive, CD-ROM drive or similar. UK9-97-066 8

The server computer system of FIG. 2 includes a keyboard 121 attached to a system unit 122 including a main CPU 123, system RAM 124, system ROM 125 and mass storage capability 126, typically in the form of multiple magnetic disk drives constituted in a RAID (redundant array of independent disks) arrangement. Stored on the disk drives are software images comprising operating system software and optionally application software for downloading to the client systems. The server system may optionally include a display 127 (if the network administrator requires direct interaction with the server system) and other storage devices such as a diskette drive (not shown) and CD-ROM drive 129. Communication over the link 26 is provided by input/output logic 128 which may take the form of an adapter card (which may be the same type adapter card employed in the client system).

To put the installation monitoring technique of this embodiment of the present invention in context, next will be described, with reference to FIG. 3, a prior art process by means of which software is installed from the server onto the disk drive of the client system.

As indicated in block 200, the client system is first powered-on. If the client system is Wake-on-LAN capable, this can be achieved by the server issuing a wake-up request to the client. Otherwise, the client system can be remotely powered-on simply by the supply of power to the client.

As indicated at step 202, the client then executes a number of self-test functions as defined by the POST code stored within the system ROM. Once the POST routines are complete, the system BIOS causes the client to invoke RPL code stored in ROM on the client's network adapter card. This RPL code, executing on the client system processor causes the client to broadcast RPL requests onto the network (step 204), the RPL requests specifying at least the network address of the client, which address is burned into adapter ROM during manufacture. The RPL code additionally opens a Service Access Point (SAP) at the client through which responses are received during the boot process. Although in the present embodiment, these boot requests take the form of RPL requests, they could equally take the form of BOOTP requests in a TCP/IP network. The RPL technique is well known and described for example in the IBM Token-Ring Network Remote Program Load User's Guide version 1.0 (reference SK2T-0333-01).

The receiving server system compares the client hardware address against a database of client addresses which it is configured to serve. Note that if the network includes a number of server systems, not all servers will necessarily be setup to configure all clients i.e. one or more servers may be BOOTP servers which are generally only capable of booting BOOTP clients. If the client address is present in the database, the server responds with a boot image (step 206) specified for that client and transfers the boot image to the client where it is loaded into system memory (step 208). The boot image includes DOS kernel, network device driver (to enable the client read data from the server), the video device driver and the command shell. The DOS kernel is loaded first, followed by the device drivers and the command shell.

Also provided is a program, for example in the form of a batch file, which when executed controls the further steps of the installation process.

Before the operating system can be installed, the hard disk drive in the client needs to be formatted (step 210). This is initiated by a batch file command to access and execute the DOS format command resident in a server directory. Disk formatting may take of the order of 2 minutes, depending on the capabilities of the network link and the client.

As indicated in step 212, once the disk formatting step is complete, DOS is then installed on the client hard disk drive. This is initiated by means of a DOS XCOPY command in the batch file which causes the DOS XCOPY command resident in server directory to be transferred to client for local execution. The DOS code resident in the server directory specified in the command is then loaded onto the previously formatted client disk drive. This step may take 5 minutes for example.

Once the installation of DOS is complete, the batch file proceeds to install the Windows operating system (step 214) (Windows is a trade mark of Microsoft Corporation). This is achieved by means of an 'unattended setup' command in the batch file which causes all the required Windows files to be installed in the client directory specified in the command. As is known, during an unattended setup, a response file is provided which automatically provides responses to the questions normally posed to the user during Windows installation. The installation of Windows may take 10 minutes; again depending on the particular network and client system.

At step 216, the installation process may then continue by customising user-specific settings. For example, the 'autoexec.bat' file may, when initially downloaded from the server include a placeholder 'username'. This is customised to the actual name of the client user by means of a simple search and replace program called by the batch file which replaces all instances of 'username' with for example JSmith. In this way the client system may be customised to the user. This process may take one minute.

Once the customisation process is complete, the client then signals to the server (step 218) that the installation process has been successfully completed. This is achieved for example by the client writing a file to a specific location on the server. The server is made to check this location periodically and if the file is present, the server knows that installation is complete. This information is useful in the context of a hybrid RPL system (as described in copending UK patent application 9605670.0). In such a system, once the installation is complete, the server changes the installation profile for the newly-installed client to cause the server to respond to future RPL requests from the client by sending a command to cause the client to boot from the client disk drive.

Once the server has been informed that the installation is complete, the client then either reboots (from its local disk drive as described in the preceding paragraph—step 220) or powers itself off (step 222).

The foregoing installation process will generally complete without error. However, if one of the steps (e.g. installation of Windows) does not complete due to a problem in the network connection or with the server system, this can cause the client system to hang or to enter an infinite timeout/retry loop. In this situation, there is no way for the network administrator to correct the problem remotely and so manual intervention is required to reboot the client computer. The preferred embodiment of the present invention addresses this problem by monitoring the installation steps as they proceed and invoking an error recovery process if an installation step does not complete within a specified time. As described below, the error recovery process employed in the present embodiment is to cause the client system to reboot. In an alternative embodiment, if the client is Wake-on-LAN capable (Wake-on-LAN is a technique developed by IBM and Intel for allowing a server system to remotely power-on a capable client), then the error recovery procedure might comprise powering-off the client for later power-on and diagnostic testing.

The automatic monitoring of the installation process is achieved in the present embodiment by the use of an amended batch file to control the operation of a software watchdog timer on the client system. The watchdog timer is advantageously written as a device driver which is set running at the beginning of each step of the installation process. If the monitored installation step does not complete before the expiration of a specified time period as defined by the watchdog timer e.g. because of server or network link failure, a counter in the watchdog timer runs to zero and the watchdog timer causes the client system to reboot.

The batch file described previously in relation to the FIG. 3 installation process is amended to control the monitoring process in that it includes further commands to cause a counter in the watchdog timer to be set at the beginning of each installation step. This time period used by the watchdog timer for each step of the installation is set to a value which under normal circumstances is greater than the time required to complete the installation step (even under situations of high network traffic). As described above, the normal installation time will generally vary for each step. Thus the value employed in the watchdog timer will be defined to be different for each monitoring step. These values could be coded into the device driver but it is advantageous to provide a timer setup program for providing timer values which when executed by the batch file writes the timer value into the watchdog device driver at the beginning of each installation step.

Advantageously where the client system is a personal computer, the watchdog timer is set-up to use the system timer interrupt (INT 8h). This is the highest priority interrupt in personal computer systems so the watchdog device driver when linked to the system timer interrupt, can regain control even if the network device driver hangs (provided the network device driver has not masked all interrupts). As is known, the address of the system timer interrupt is defined in the interrupt vector table. When the watchdog device driver is loaded it obtains the address of INT 8h from the interrupt vector table and stores this in the watchdog device driver code. The device driver then stores the address of its interrupt service routine in the interrupt vector table such that when the system timer interrupt is called, the vector table points to the watchdog timer.

As mentioned above, the counter value in the watchdog timer is set by the timer setup program which is called by the batch file and which writes a specified time value (e.g. in minutes) to the watchdog timer. Note that one advantage of implementing the watchdog timer as a device driver is that it allows time values to be readily provided to the watchdog timer. The watchdog timer can alternatively be implemented as a TSR program but then the time values would have to be provided via software interrupts. In this case, it would be difficult to ensure that the chosen software interrupt was not required by another process or TSR executing on the client system.

If the value supplied by the timer setup program is represented in minutes then the counter value for the watchdog timer is obtained by multiplying the supplied value by 60 (i.e. seconds in a minute) and by the number of ticks per second corresponding to the frequency at which the system timer interrupt is normally serviced in the client system (e.g. if time=3 minutes and the ticks/second=18.2, then the watchdog counter is set to 3*60*18.2=3376). This value therefore sets the time for which the installation step is monitored. Once set, the watchdog timer starts automatically and the counter is decremented 18.2 times per second (i.e. each time INT 8h is called by the client system) until either the process step is complete or the counter goes to zero. In the latter case, the device driver causes the client system to reboot via the keyboard controller and the reset line to the CPU. Each time, the timer decrements, the DOS timer interrupt routine is called and its counter there is decremented.

Figure 4:
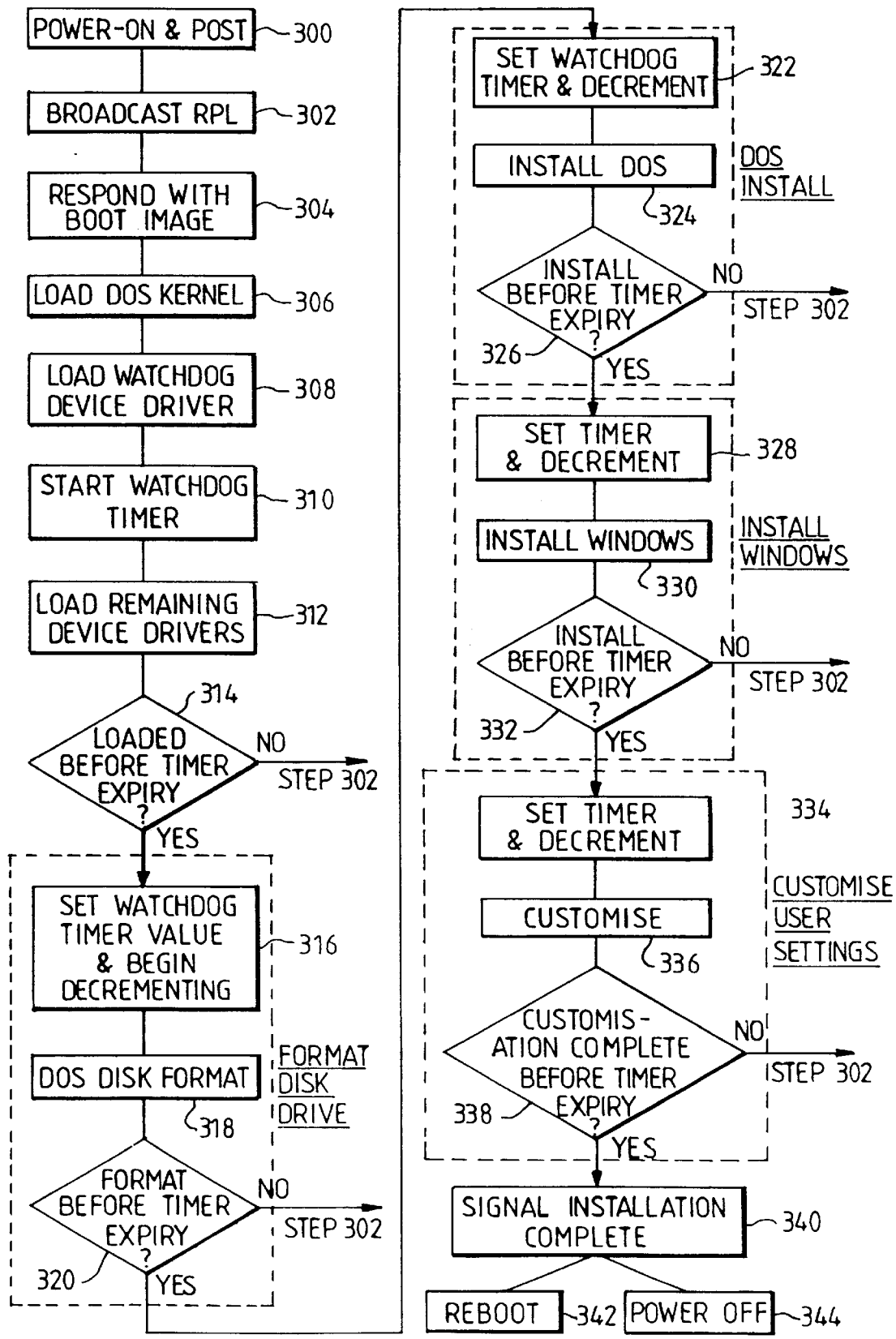
FIG. 4 is a flow chart showing the steps of the software installation process according to the embodiment of the present invention.

The installation process, including the monitoring process will now be described with reference to FIG. 4.

Figure 3:
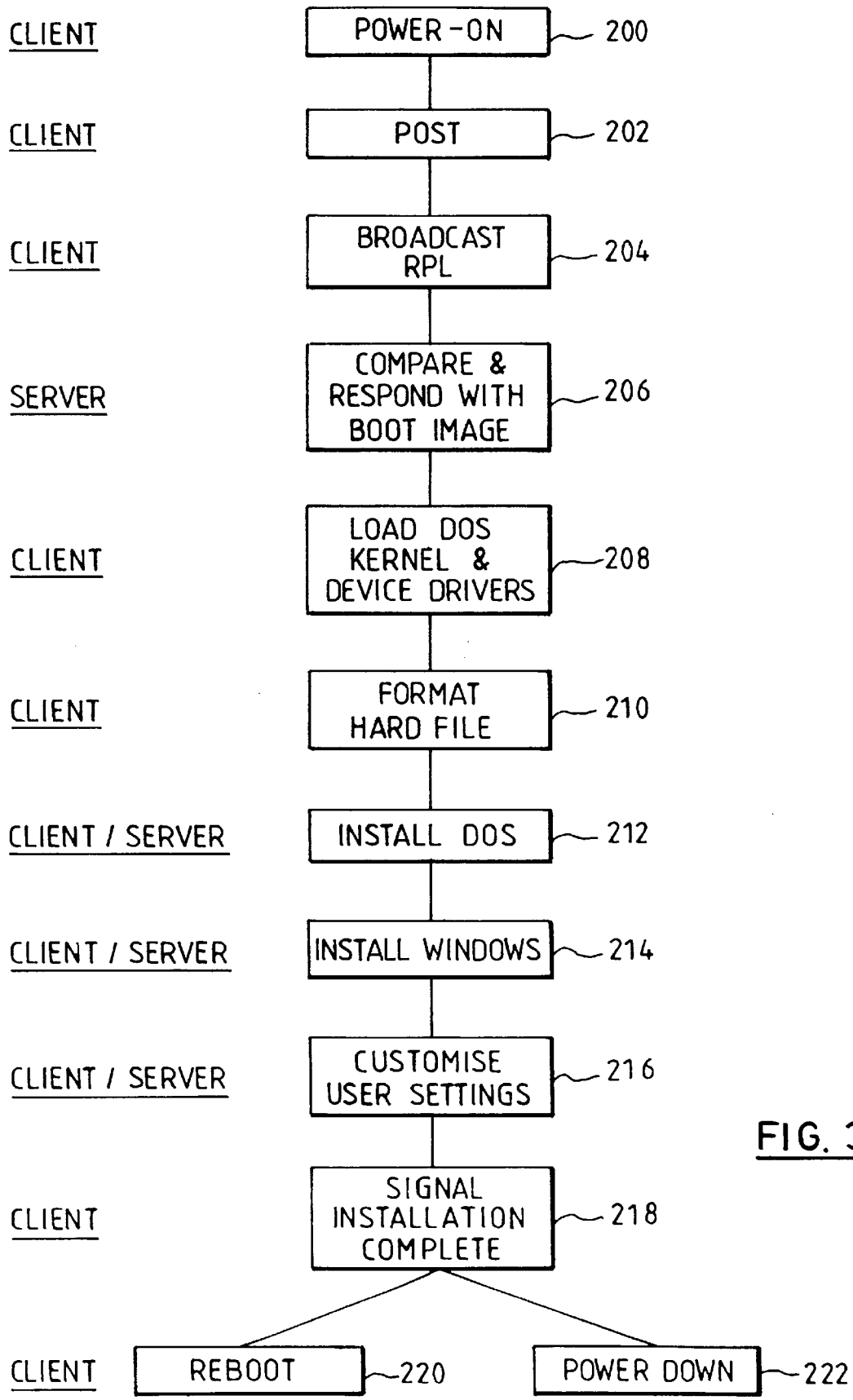
FIG. 3 is a flow chart showing the steps involved in a known software installation process.

The client is first powered-on (step 300) as per step 200 of FIG. 3 and executes POST. The client then broadcasts RPL requests onto the network, requesting a boot image from a server (step 302). The appropriate server responds with a boot image (step 304) which, in addition to the DOS Kernel, device drivers and command shell further includes the watchdog device driver, amended batch file and timer setup program. The server orders the components of the boot image such that, at the client, the DOS kernel is loaded first (step 306), followed by the watchdog device driver (step 308). Note that the watchdog device driver is advantageously loaded by the client as early as possible in the installation process so that it is available to monitor the correct loading of the other boot image components e.g. the network and video device drivers. If these other device drivers were loaded before the watchdog timer device driver then a problem in loading these drivers might cause the client system to hang before the watchdog timer was available.

When the watchdog device driver is installed it links to the system timer interrupt as described above and automatically starts its counter decrementing (step 310). By running the timer immediately, this gives protection against an error occurring during the installation of other device drivers, in particular the network device driver(s) required by the network interface. This initial counter value is hard-coded into the device driver and is chosen to be greater than the time expected for the loading of the remaining device drivers. For example, if it normally takes 2 minutes to install the remaining device drivers, the hard-coded counter value might be 3 minutes (multiplied by 1092 as described above).

The watchdog counter decrements while the other device drivers are loaded from the server (step 312). If the other device drivers are not completely loaded before the timer decrements to zero, the client system reboots and returns to step 302. If the device drivers are loaded before the timer expires, the batch file proceeds to the next step in the installation process and causes the timer setup program to write a new time value to the watchdog timer device driver (step 316).

As the next installation step is to format the client hard disk drive, which for example typically requires less than two minutes to complete, the value written to the watchdog timer may be 3 minutes for example. As described above, the counter value employed by the watchdog timer is then calculated, the counter value is set and the timer starts automatically. In the meantime, a batch file command to format the hard disk drive is executed (step 318). This is achieved as described above in relation to FIG. 3.

If, for example, there is a problem with the network or the server while the DOS format file is being sent from the server to the client, then the formatting operation may not complete within the set three minute period. If this happens, the watchdog counter decrements to zero and the device driver causes a system reboot via the keyboard controller and the CPU reset line. The client system then reboots and requests a boot image from server (as per step 302). If the earlier problem with the network no longer exists then the disk format operation will proceed as per normal. Note that if the original problem lies with the hard disk drive itself rather than with the network, then the appropriate error code would be returned to the batch file and would be handled by the client system in the conventional manner.

If the disk format operation completes before the timer expires (step 320), the next batch file command causes the timer setup program to write the timer value for the next installation step to the watchdog device driver (step 322). As the next step is to load DOS and this normally takes 5 minutes, the timer value supplied by the setup program may be 8 minutes for example. The watchdog timer calculates its counter value and begins decrementing automatically. In the meantime, the client system begins to XCOPY DOS from the specified server directory to the client hard file (step 324). As before, if this process does not complete before the counter decrements to zero, the client system will reboot.

If however, as indicated at step 326, DOS is loaded successfully before the timer expires, the installation proceeds to the next step of installing Windows. The watchdog timer is again set, e.g. with a value of 20 minutes and the counter begins automatically (step 328). As indicated at step 330, Windows is installed on the client hard disk drive as per step 214 of FIG. 3. If Windows is loaded before the timer expires (step 332), the watchdog timer is set to two minutes to monitor the customisation of the user settings (step 334). The user settings are customised (step 336) as described above with reference to FIG. 3. If the customisation completes before the timer expires, the client signals to the server that the installation process is complete (step 340). The client system can either reboot (step 342); in which case it will boot from its local disk drive, or can power-off (step 344) to be either powered on by the client user or alternatively woken-up by the server at some later time.

In the embodiment described above, when the watchdog timer expires before the completion of a particular installation step, the system reboots and the installation process is restarted from the beginning. In an alternative arrangement, when the system is rebooted, it checks to see whether, in the previous attempt, any of the installation operations completed successfully. If so, the installation process proceeds to the step during which the timer expired during the previous attempt. For example, if the installation fails during the installation of Windows, the client reboots and proceeds to check first whether the disk was correctly formatted (by attempting a write operation for example) and second whether DOS installed correctly (e.g. by checking for presence of DOS files). The client would then check for presence of Windows files and on a determination that none or not all files were stored on the disk, the client would then restart the installation of Windows.

What is claimed is:

1. A method for automatically installing software on a client data processing system from a server data processing system connected thereto, the method comprising:

executing a plurality of installation operations on the client to load the software thereon;

executing watchdog timer code on the client system to monitor the successful completion of each of the installation operations by measuring a preselected period of time for the execution of each of the software installation operations; and invoking an error recovery process in the client system on expiration of the preselected time period associated with any one of the installation operations.

2. A method as claimed in claim 1, wherein the step of invoking an error recovery process comprises automatically rebooting the client system.

3. A method as claimed in claim 1, further comprising:

transferring the watchdog timer code from the server to the client system.

4. A method as claimed in claim 1, wherein the watchdog timer code comprises a device driver.

5. A method as claimed in claim 4 wherein the watchdog timer device driver is linked to the system timer interrupt of the client system.

6. A method as claimed in claim 4, wherein the watchdog timer device driver is loaded by the client system prior to loading of other client device drivers.

7. A method as claimed in claim 4, comprising the further steps of:

transferring timer setup code from the server system to the client system, the setup code defining the preselected time periods for each of the selected installation operations; and at the start of each installation operation, executing the timer setup code to write the preselected time period associated with each operation to the watchdog device driver.

8. A data processing system connectable for communication to a server data processing system having stored therein software for installation on the data processing system; the data processing system including:

mass storage means for storing the software transferred from the server data processing system;

means for installing the transferred software on the mass storage means in a plurality of installation operations; and watchdog timer code, executable on a processor of the data processing system, for monitoring the successful completion of each of the installation operations by measuring a preselected period of time for each operation and for invoking an error recovery procedure in the client system in the event that an installation step does not complete successfully prior to the expiration of the preselected period of time associated with the unsuccessful operation.

9. A system as claimed in claim 8, the watchdog timer code comprising a device driver received from the server data processing system.

10. A system as claimed in claim 9, further including:

timer setup means operable, at the beginning of each installation operation, to write a value corresponding to the preselected period of time to the watchdog device driver.

11. A method for monitoring the transfer of data from a server data processing system to a client data processing system connected thereto, the transfer operation comprising a plurality of steps, the method comprising:

executing watchdog timer code on the client system to measure a preselected period of time for selected ones of the data transfer steps;

invoking an error recovery process in the client system in the event that one of the selected steps does not complete before the preselected time period associated therewith.

12. A method as claimed in claim 11, wherein the step of invoking an error recovery process comprises automatically rebooting the client system.

13. A computer program product comprising:

a computer usable medium having computer readable program code means embodied in said medium for causing the automatic installation of software on a client data processing system for a server data processing system connected thereto, the computer readable program code means comprising:

computer readable program code means for causing the client data processing system to execute a plurality of installation operations thereon;

computer readable program code means for causing the client data processing system to execute watchdog timer code to monitor the successful completion of each of the installation operations by measuring a preselected period of time for the execution of each of the software installation operations; and computer readable program code means for causing the client data processing system to invoke an error recovery process on expiration of the preselected time period associated with any one of the installation operations.

* * * * *